United States Patent
Park et al.

(10) Patent No.: US 10,694,483 B2
(45) Date of Patent: Jun. 23, 2020

(54) METHOD AND APPARATUS FOR SYNCHRONIZATION IN DEVICE TO DEVICE COMMUNICATION SYSTEM

(71) Applicant: Samsung Electronics Co., Ltd., Suwon-si, Gyeonggi-do (KR)

(72) Inventors: Seung-Hoon Park, Seoul (KR); Peng Xue, Hwaseong-si (KR); Hyun-Seok Ryu, Yongin-si (KR); Cheol Jeong, Seongnam-si (KR); Hyun-Kyu Yu, Suwon-si (KR); Sang-Won Choi, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 226 days.

(21) Appl. No.: 14/708,679

(22) Filed: May 11, 2015

(65) Prior Publication Data
US 2015/0327191 A1    Nov. 12, 2015

(30) Foreign Application Priority Data

May 10, 2014    (KR) .......................... 10-2014-0056009

(51) Int. Cl.
| | |
|---|---|
| *H04W 56/00* | (2009.01) |
| *H04W 72/04* | (2009.01) |
| *H04W 76/14* | (2018.01) |
| *H04W 88/02* | (2009.01) |
| *H04W 8/00* | (2009.01) |
| *H04L 7/033* | (2006.01) |
| *H04W 76/23* | (2018.01) |
| *H04L 7/04* | (2006.01) |
| *H04L 7/00* | (2006.01) |

(52) U.S. Cl.
CPC ......... *H04W 56/002* (2013.01); *H04W 56/00* (2013.01); *H04W 72/0406* (2013.01); *H04W 76/14* (2018.02); *H04L 7/0054* (2013.01); *H04L 7/033* (2013.01); *H04L 7/04* (2013.01); *H04W 8/005* (2013.01); *H04W 76/23* (2018.02); *H04W 88/02* (2013.01)

(58) Field of Classification Search
CPC ... H04W 8/005; H04W 56/00; H04W 56/002; H04W 72/0406; H04W 76/023; H04W 88/02; H04W 76/14; H04W 76/23; H04L 7/04; H04L 7/0054; H04L 7/033
See application file for complete search history.

(56) References Cited

U.S. PATENT DOCUMENTS

| | | | | |
|---|---|---|---|---|
| 8,571,005 | B1 * | 10/2013 | Vleugels | ................... G06F 5/16 |
| | | | | 370/350 |
| 9,756,252 | B2 * | 9/2017 | Shiohara | ................ H04N 5/341 |

(Continued)

OTHER PUBLICATIONS

Korean Office Action dated Mar. 30, 2020, issued in a counterpart Korean Application No. 10-2014-0056009.

*Primary Examiner* — Asad M Nawaz
*Assistant Examiner* — Kai Chang
(74) *Attorney, Agent, or Firm* — Jefferson IP Law, LLP

(57) ABSTRACT

A method for performing synchronization by a device in a device to device (D2D) communication system is provided. The method includes transmitting a first synchronization signal, and transmitting offset information indicating a time difference between a synchronization reference time of the first synchronization signal and a transmission time of the first synchronization signal.

29 Claims, 11 Drawing Sheets

(56) References Cited

U.S. PATENT DOCUMENTS

| | | | |
|---|---|---|---|
| 10,159,054 B2 * | 12/2018 | Li | H04W 76/14 |
| 10,212,676 B2 * | 2/2019 | Lee | H04W 56/00 |
| 10,334,645 B2 * | 6/2019 | Chae | H04W 76/14 |
| 2009/0016321 A1 * | 1/2009 | Li | H04W 56/0015 370/350 |
| 2010/0008383 A1 * | 1/2010 | Koga | H04J 3/0682 370/503 |
| 2010/0322174 A1 * | 12/2010 | Ji | H04W 74/006 370/329 |
| 2011/0286376 A1 * | 11/2011 | Yoo | H04W 56/00 370/312 |
| 2012/0258706 A1 * | 10/2012 | Yu | H04W 56/0045 455/426.1 |
| 2012/0307670 A1 * | 12/2012 | Kazmi | H04W 24/10 370/252 |
| 2013/0182806 A1 * | 7/2013 | Obradovic | H04J 3/0673 375/356 |
| 2013/0336307 A1 * | 12/2013 | Park | H04W 56/00 370/350 |
| 2014/0105342 A1 | 4/2014 | Ray et al. | |
| 2014/0169326 A1 * | 6/2014 | Levanen | H04W 56/00 370/330 |
| 2014/0211781 A1 * | 7/2014 | Kim | H04W 56/0025 370/350 |
| 2014/0254564 A1 * | 9/2014 | Khude | H04W 16/10 370/336 |
| 2014/0329494 A1 * | 11/2014 | Zisimopoulos | H04M 15/66 455/406 |
| 2015/0043398 A1 * | 2/2015 | Fwu | H04W 76/14 370/280 |
| 2015/0043545 A1 * | 2/2015 | Cheng | H04W 56/00 370/336 |
| 2015/0181546 A1 * | 6/2015 | Freda | H04W 56/0015 370/336 |
| 2015/0215882 A1 * | 7/2015 | Khoryaev | H04W 56/001 370/336 |
| 2015/0296469 A1 * | 10/2015 | Yoon | H04W 76/023 370/350 |
| 2015/0296526 A1 * | 10/2015 | Behravan | H04W 16/14 370/329 |
| 2015/0319701 A1 * | 11/2015 | Ng | H04L 5/005 370/311 |
| 2016/0029333 A1 * | 1/2016 | Seo | H04J 11/00 370/350 |
| 2016/0112977 A1 * | 4/2016 | Byun | H04W 56/0015 370/350 |
| 2016/0183115 A1 * | 6/2016 | Seo | H04W 8/005 455/422.1 |
| 2016/0205713 A1 * | 7/2016 | Seo | H04W 76/14 370/280 |
| 2016/0212723 A1 * | 7/2016 | Yu | H04W 56/002 |
| 2016/0227518 A1 * | 8/2016 | Li | H04W 72/042 |
| 2016/0249311 A1 * | 8/2016 | Yu | H04W 4/70 |
| 2016/0278136 A1 * | 9/2016 | Sorrentino | H04W 56/0025 |
| 2016/0295613 A1 * | 10/2016 | Wager | H04L 41/0813 |
| 2016/0309430 A1 * | 10/2016 | Chae | H04W 56/00 |
| 2018/0182280 A1 | 6/2018 | Li et al. | |

* cited by examiner

METHOD AND APPARATUS FOR SYNCHRONIZATION IN DEVICE TO DEVICE COMMUNICATION SYSTEM

CROSS-REFERENCE TO RELATED APPLICATION(S)

This application claims the benefit under 35 U.S.C. § 119(a) of a Korean patent application filed on May 10, 2014, in the Korean Intellectual Property Office and assigned Serial number 10-2014-0056009, the entire disclosure of which is hereby incorporated by reference.

TECHNICAL FIELD

The present disclosure relates to a method and apparatus for synchronization in a wireless communication system. More particularly, the present disclosure relates to a method and apparatus for performing synchronization in a Device to Device (D2D) communication system.

BACKGROUND

To meet the demand for wireless data traffic having increased since deployment of 4G ($4^{th}$-Generation) communication systems, efforts have been made to develop an improved 5G ($5^{th}$-Generation) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Recently, due to the spread of wireless terminals supporting broadband multimedia services, such as smart phones, tablet Personal Computers (PCs) and the like, data traffic has increased exponentially in the wireless network. Since the number of users of the wireless terminals will further increase, and multimedia services provided using the wireless terminals will be further popularized, the data traffic in the wireless network is expected to increase much more than now. If even Machine to Machine (M2M) communication utilizing things (e.g., communication between things such as home appliances), which is a new communication service, is commercialized in addition to the typical communication services such as audio and video communication between users, the amount of data traffic that is processed by a Base Station (BS) or an evolved Node B (eNB) in the wireless network is predicted to increase dramatically, so the eNB may have difficulty in dealing with the higher levels of data traffic. Device to Device (D2D) communication has attracted much attention as one of the schemes for coping with the increase in data traffic in the wireless network.

The D2D communication has attracted attention in both the licensed band that is used in mobile communication and in the unlicensed band that is used by communication such as Wireless Local Area Network (WLAN). If the D2D communication is integrated with the existing mobile communication, it is noteworthy in that the traffic capacity of the eNB may increase and the overload of the eNB may be reduced. In D2D communication, after a D2D link for D2D communication is established between User Equipments (UEs) in the same cell or adjacent cells, the UEs may directly exchange data with each other via the D2D link without going through the eNB. In this case, it is possible to reduce two links (e.g., a link from a UE to an eNB, and a link from the eNB to another UE) to one link (e.g., a link from a UE to another UE), contribution to a reduction in the overload of the eNB.

In the meantime, for D2D communication, a process of setting up synchronization between devices is required. Generally, a terminal may set up synchronization based on the time information that is received from a synchronous base station or received through a Global Positioning System (GPS) receiver module in the terminal Therefore, in D2D communication, if synchronization is set up using the scheme of the related art, each device should access the synchronous base station or use the GPS receiver module, for synchronization setup.

In addition, depending on the type of the communication scheme supported in the communication system, the synchronous base station may not be supported, and if a device is located in a GPS shaded area (e.g., the space between the skyscrapers, the tunnel, the interior of the building, and the like), the device may not set up synchronization since the device cannot receive time information through its GPS receiver module. Eventually, if the device cannot use the synchronous base station or the GPS receiver module, the device of the related art may not even initiate the D2D communication.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for efficiently performing synchronization between devices in a Device to Device (D2D) communication system.

Another aspect of the present disclosure is to provide a resource structure for synchronization between devices in a D2D communication system.

Another aspect of the present disclosure is to provide a method and apparatus for synchronizing a synchronization reference time and a system frame number in a D2D communication system.

In accordance with an aspect of the present disclosure, a method for performing synchronization by a device in a D2D communication system is provided. The method comprises transmitting a first synchronization signal, and transmitting offset information indicating a time difference between a synchronization reference time of the first synchronization signal and a transmission time of the first synchronization signal.

In accordance with an aspect of the present disclosure, a device for performing synchronization in a D2D communication system, the device comprises a communication interface for D2D communication, and a controller configured to control transmitting a first synchronization signal, and transmitting offset information indicating a time difference between a synchronization reference time of the first synchronization signal and a transmission time of the first synchronization signal.

In accordance with another aspect of the present disclosure, a method for performing synchronization by a device in a D2D communication system is provided. The method includes receiving a first synchronization signal from a synchronization reference device and transmitting a second synchronization signal that has a time difference with respect to the first synchronization signal.

In accordance with another aspect of the present disclosure, a device for performing synchronization in a D2D communication system is provided. The device includes a communication interface for D2D communication and a controller configured to control receiving a first synchronization signal from a synchronization reference device, and transmitting a second synchronization signal that has a time difference with respect to the first synchronization signal.

In accordance with another aspect of the present disclosure, a method for performing synchronization by a device in a D2D communication system is provided. The method includes receiving a second synchronization signal that has a time difference with respect to a first synchronization signal receiving offset information indicating a time difference between a synchronization reference time of the second synchronization signal and a transmission time of the second synchronization signal, and determining the synchronization reference time based on the offset information.

In accordance with another aspect of the present disclosure, a device for performing synchronization in a D2D communication system is provided. The device includes a communication interface for D2D communication and a controller configured to control receiving a second synchronization signal that has a time difference with respect to a first synchronization signal, receiving offset information indicating a time difference between a synchronization reference time of the second synchronization signal and a transmission time of the second synchronization signal, and determining the synchronization reference time based on the offset information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
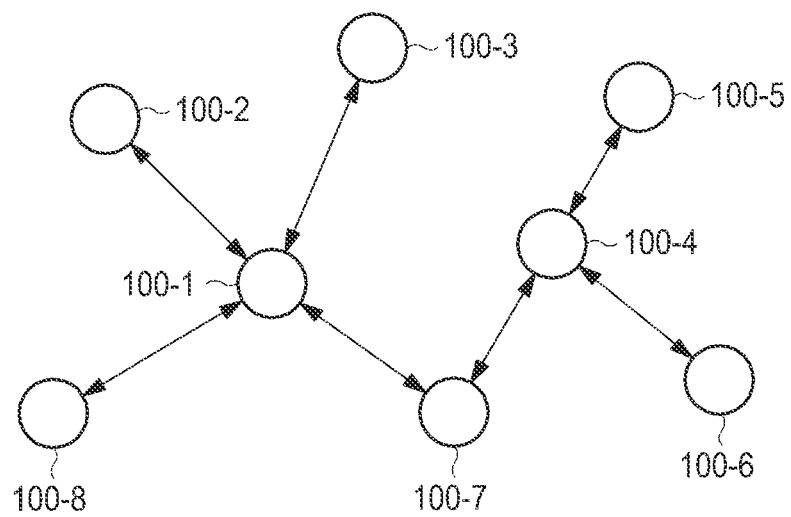
FIG. 1 illustrates a flat synchronization method in a Device to Device (D2D) communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

An evolved Node B (eNB), which is a network entity for communicating with a User Equipment (UE), may be referred to as a Base Station (BS), a Base Transceiver Station (BTS), a Node B (NB), an Access Point (AP), and the like. A UE, which is a network entity for communicating with an eNB, may be referred to as a device, a Mobile Station (MS), a Mobile Equipment (ME), a terminal and the like. In this specification, a UE performing Device to Device (D2D) communication will be referred to as a device. The device may be various communication devices that have a D2D communication function even though they do not perform communication with the eNB.

In the embodiment of the present disclosure, devices performing D2D communication may be divided into a synchronization transmission device and a synchronization reception device. The synchronization transmission device may be a device that transmits a synchronization signal and/or a synchronization channel for synchronization between devices in the D2D communication system. The synchronization reception device may be a device that receives the synchronization signal and/or the synchronization channel. The synchronization transmission device may be referred to as a synchronization source. If the eNB transmits the synchronization signal, the synchronization transmission device may be the eNB.

Also, in the embodiment of the present disclosure, the synchronization signal and the synchronization channel may be referred to as a D2D Synchronization Signal (D2DSS) and a D2D Synchronization Channel (D2DSCH), respectively. For the D2DSCH, a broadcast channel or a channel on which system information is transmitted may be used. In this case, the D2DSCH may be referred to as a D2D Broadcast Channel (D2DBCH) or a D2D System Information Channel (D2DSICH).

Further, in the embodiment of the present disclosure, the synchronization signal means a signal including a synchronization sequence that can be used to distinguish a cluster or a synchronization transmission device, and the term 'synchronization resource' refers to a resource that is used to transmit the synchronization signal in the communication system. The synchronization channel means a channel on which synchronization-related (or system) information (or message) is transmitted. The synchronization transmission device may transmit at least one of the synchronization signal and the synchronization channel.

In D2D communication, the cluster means a collection (e.g., group or set) of at least one device associated with (or belonging to) at least one Synchronization Head (SH). A synchronization transmission device that plays the role of an SH to create the cluster may be referred to as a synchronization reference device. The synchronization reference device may independently determine the timing for synchronization (e.g., synchronization reference time), except when the synchronization reference device exists in eNB coverage.

There may exist one or multiple synchronization reference devices, and if there exist multiple synchronization reference devices, a synchronization transmission device that volunteers so that multiple synchronization reference devices may match the synchronization reference time with each other will be referred to as a volunteering synchronization device (or a volunteering synchronization source).

In addition, a synchronization relaying device (or a synchronization relaying source) may be a synchronization transmission device that synchronizes the synchronization reference time with the synchronization reference device, and then relays (i.e., receives and forwards) the synchronization signal or synchronization channel that is transmitted from the synchronization reference device. When the synchronization relaying device forwards the synchronization signal received from the eNB, the synchronization relaying device may play the role of an SH.

In D2D communication, one or multiple devices belonging to the same cluster may be defined as a synchronization reception device that receives the synchronization signal transmitted from the SH. One or multiple devices belonging to the same cluster may set (or adjust) the synchronization reference time by receiving the synchronization signal transmitted from the SH. The synchronization reference time may be used for a transmission operation in D2D communication, and in some cases, in D2D communication, a reception operation may not depend on the synchronization reference time received from the SH.

In order for devices (or D2D devices) to match synchronization with each other in the situation where an eNB is not discovered in the network, a device may receive a synchronization signal transmitted from another device, and synchronize the synchronization reference time using the received synchronization signal. Therefore, in the situation where an eNB is not discovered, an arbitrary device may transmit a synchronization signal to its nearby devices on behalf of the eNB.

In the meantime, transmission of a synchronization signal by a device may not be suitable for broadcast communication between devices, in which one device transmits a synchronization signal to all of its nearby devices located within its communication coverage. The reason is that a synchronization reception device located in the boundary of a cluster configured by one synchronization transmission device may receive a synchronization signal even from a synchronization transmission device belonging to its nearby other cluster, and there may exist an error between the synchronization reference time in the cluster to which the synchronization reception device belongs, and the synchronization reference time in the other cluster.

Therefore, in D2D communication, in order for a device to ensure the maximum area where the device is synchronized with its nearby devices, it is possible to use, for example, the following two methods.

A first method is a flat synchronization method of matching the synchronization reference time between devices.

FIG. 1 illustrates a flat synchronization method in a D2D communication system according to an embodiment of the present disclosure.

Referring to FIG. 1, all devices 100-1 to 100-8 may be synchronization transmission devices, and each device may adjust the synchronization reference time so that the device may be matched with its nearby other devices in terms of the synchronization reference time.

A second method is an Inter-Cluster Synchronization (ICS) method for matching the synchronization reference time between clusters.

Figure 2:
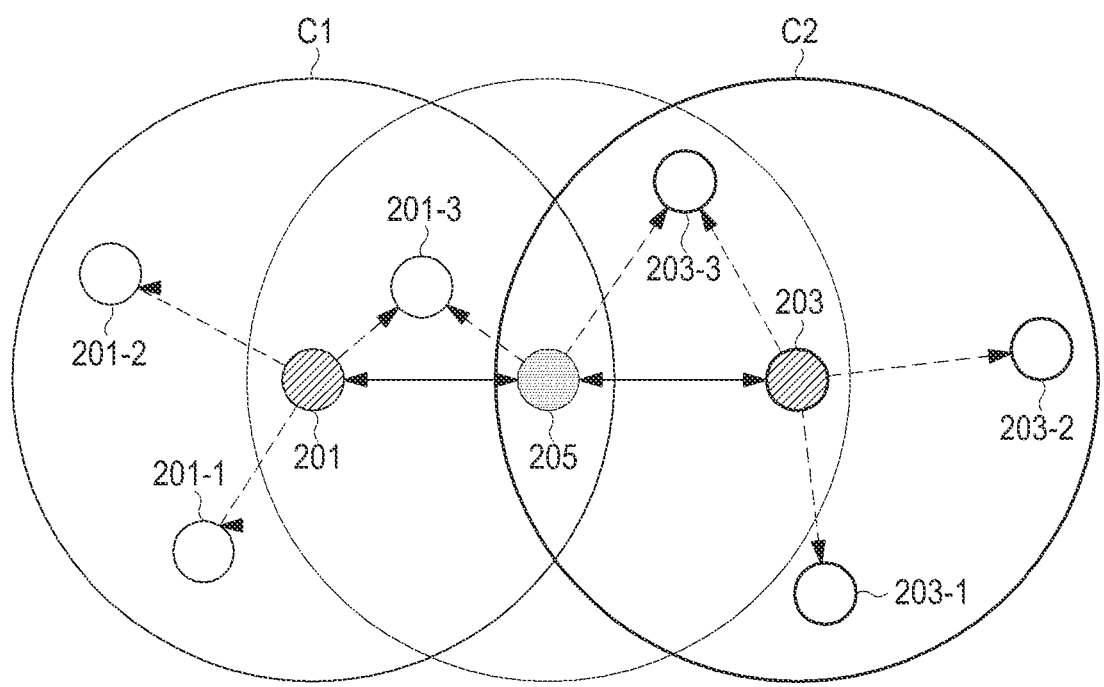
FIG. 2 illustrates an Inter-Cluster Synchronization (ICS) method in a D2D communication system according to an embodiment of the present disclosure.

FIG. 2 illustrates an ICS method in a D2D communication system according to an embodiment of the present disclosure.

Referring to FIG. 2, a plurality of devices 201 and 201-1~201-3 may belong to a first cluster C1, and the devices 201-1~201-3 may set (or adjust) the synchronization reference time based on the synchronization signal transmitted from the first synchronization reference device 201 that is an SH. A plurality of devices 203 and 203-1~203-3 may belong to a second cluster C2, and the devices 203-1~203-3 may set (or adjust) the synchronization reference time based on the synchronization signal transmitted from the second synchronization reference device 203 that is an SH. A volunteering synchronization device 205 may transmit a synchronization signal between the first synchronization reference device 201 and the second synchronization reference device 203 so that the first synchronization reference device 201 and the second synchronization reference device 203 may be synchronized at the same synchronization reference time. The volunteering synchronization device 205 may not create a separate cluster.

A detailed description will now be made of the inter-device synchronization method and the ICS method according to an embodiment of the present disclosure, and of the frame structure of resources (hereinafter, synchronization resources) for transmission of a synchronization signal and/or a synchronization channel, for the synchronization methods, and the method for synchronizing a synchronization reference time and a system frame number.

Figure 3:
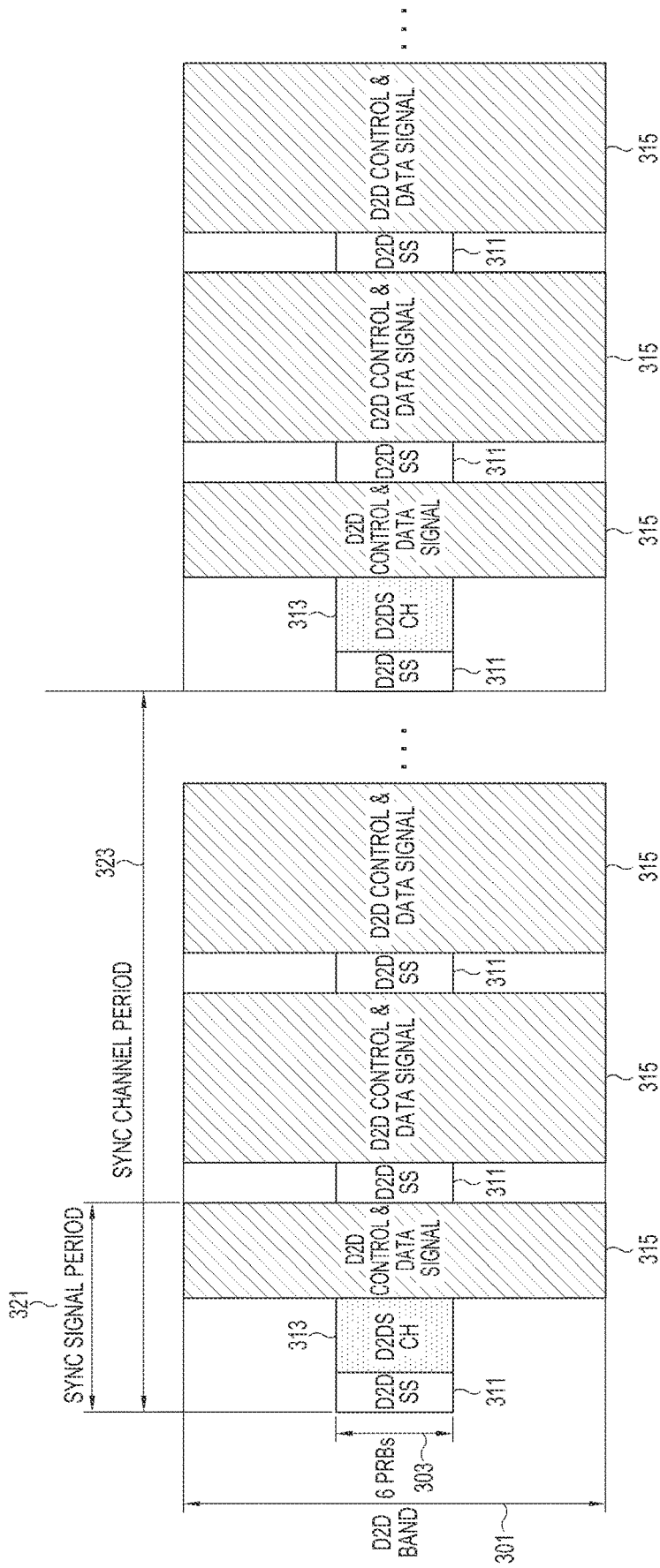
FIG. 3 illustrates an example of deploying resources (hereinafter, synchronization resources) of a synchronization signal and a synchronization channel in a D2D communication system according to an embodiment of the present disclosure.

FIG. 3 illustrates an example of deploying resources (hereinafter, synchronization resources) of a synchronization signal and a synchronization channel in a D2D communication system according to an embodiment of the present disclosure. The example of FIG. 3 assumes a case of performing D2D communication in a Long Term Evolution (LTE) system.

Referring to FIG. 3, a D2DSS 311 and a D2DSCH 313 may be transmitted using, for example, 6 Physical Resource Blocks (PRBs) 303 located in the center of a D2D band 301. Reference numeral 315 represents a resource region in which D2D control signal and data are transmitted. Although the D2D control signal and data are transmitted together in the example of FIG. 3, the resource regions in which the control signal and data are transmitted may be separated. Further, in FIG. 3, a device may transmit the synchronization signal 311 and/or the synchronization channel 313 in the resources that are allocated by the eNB or allocated according to the predetermined rules. In FIG. 3, a transmission period of a synchronization signal (hereinafter, a synchronization signal period) 321 and a transmission period of a synchronization channel (hereinafter, a synchronization channel period) 323 may be different from each other. A device that transmits a synchronization signal and a device that transmits a synchronization channel may be generally the same, but a device that relays only the synchronization channel without relaying the synchronization signal may not be the same. In another embodiment, the synchronization signal period may be fixed, and the synchronization channel period may be different for each device.

In an embodiment of the present disclosure, as for a method of synchronizing the synchronization reference time by receiving a synchronization signal, a synchronization method between devices and a synchronization method between a synchronization reference device and a volunteering synchronization device may be the same. Devices belonging to the same cluster may follow the synchronization reference time of a SH (i.e., a synchronization reference device) of the cluster to which the devices belong.

In addition, in an embodiment of the present disclosure, as for a method of synchronizing the system frame number by receiving a synchronization channel, a synchronization method between devices and a synchronization method between a synchronization reference device and a volunteering synchronization device may be the same. Devices belonging to the same cluster may follow the system frame number of an SH (i.e., a synchronization reference device) of the cluster to which the devices belong.

In the communication system, synchronizing the synchronization reference time may be construed as symbol synchronization, slot synchronization and frame synchronization for matching the boundaries of physical layer symbols, slots and frames. Therefore, in this embodiment, synchronizing the synchronization reference time means matching at least one of the symbol synchronization, slot synchronization and frame synchronization in the communication system that synchronizes the synchronization reference time.

In the embodiment of the present disclosure, a synchronization transmission device may transmit a synchronization signal depending on the synchronization reference time, and may receive the synchronization signal transmitted from an adjacent synchronization transmission device in the whole or partial interval of the time interval in which the synchronization transmission device does not transmit the synchronization signal.

Various examples of the synchronization method of adjusting the synchronization between adjacent synchronization transmission devices, the synchronization reference times of which are not matched, or which are unsynchronized, are the same as the following methods 1) to 5), and a combination of the methods is also possible.

1) A synchronization transmission device may calculate an average synchronization reference time based on the synchronization signal having a different synchronization reference time, which is received during the synchronization signal period, and use the calculated average synchronization reference time as its own synchronization reference time in the next synchronization signal period.

2) A synchronization transmission device may select a synchronization signal having the highest reception power from at least one synchronization signal having a different synchronization reference time, which is received during the synchronization transmission period, and use the synchronization reference time of the selected synchronization signal as its own synchronization reference time in the next synchronization transmission period.

3) A synchronization transmission device may select a synchronization signal having the fastest synchronization reference time from at last one synchronization signal having a different synchronization reference time, which is received during the synchronization transmission period, and use the synchronization reference time of the selected synchronization signal as its own synchronization reference time in the next synchronization transmission period.

4) A synchronization transmission device may select a synchronization signal (or the synchronization signal that has lasted longest since the synchronization transmission device became a synchronization transmission device that transmits a synchronization signal) having the greatest age of the synchronization reference time from among at least one synchronization signal having a different synchronization reference time, which is received during the synchronization transmission period, and use the synchronization reference time of the selected synchronization signal as its own synchronization reference time in the next synchronization transmission period.

5) A synchronization transmission device may select a synchronization signal having the smallest hop count of a synchronization signal from at least one synchronization signal having a different synchronization reference time, which is received during the synchronization transmission period, and use the synchronization reference time of the selected synchronization signal as its own synchronization reference time in the next synchronization transmission period.

An aspect of an embodiment of the present disclosure may provide a synchronization method of determining whether to use the synchronization reference time of the received synchronization signal as its own synchronization reference time according to the predetermined condition, each time the synchronization transmission device receives a synchronization signal from another synchronization transmission device during one synchronization transmission period. This synchronization method may enable faster synchronization convergence, compared with the synchronization methods of 1) to 5). In this embodiment, as for the synchronization method based on the predetermined condition, a synchronization method based on a counter value, a simplified Pulse Coupled Oscillator (PCO) synchronization method and a hybrid method of the two synchronization methods are provided.

Synchronization Method Based on Counter Value

A synchronization transmission device may transmit its own counter value using a synchronization signal and/or a synchronization channel. The counter value may be variables that change over time in the communication system, and the variables may be, for example, an age of the synchronization reference time (e.g., the time up to a current time since the synchronization transmission device became a synchronization transmission device), a repeated timer value, a number of times that the synchronization transmission device has transmitted a synchronization signal, or a slot/frame index.

If a synchronization transmission device (hereinafter, a first device) does not transmit a synchronization signal (hereinafter, a first synchronization signal), the synchronization transmission device may receive a synchronization signal (hereinafter, a second synchronization signal) transmitted from another synchronization transmission device (hereinafter, a second device). The first device may check a second counter value by receiving the second synchronization signal from the second device, and compare the second counter value with its own first counter value. As to the comparison condition, the first device may determine the counter values in various ways, for example, may determine whether the first counter value is greater than the received second counter value, whether the first counter value is equal to or greater than the received second counter value, whether the first counter value is less than the received second counter value, or whether the first counter value is equal to or less than the received second counter value. If the comparison condition is satisfied, the first device may match its own first synchronization reference time to a second synchronization reference time of the second synchronization signal received from the second device. If the comparison condition according to this embodiment is satisfied, the first device may match its own first counter value to the second counter value of the received second synchronization signal.

Figure 4:
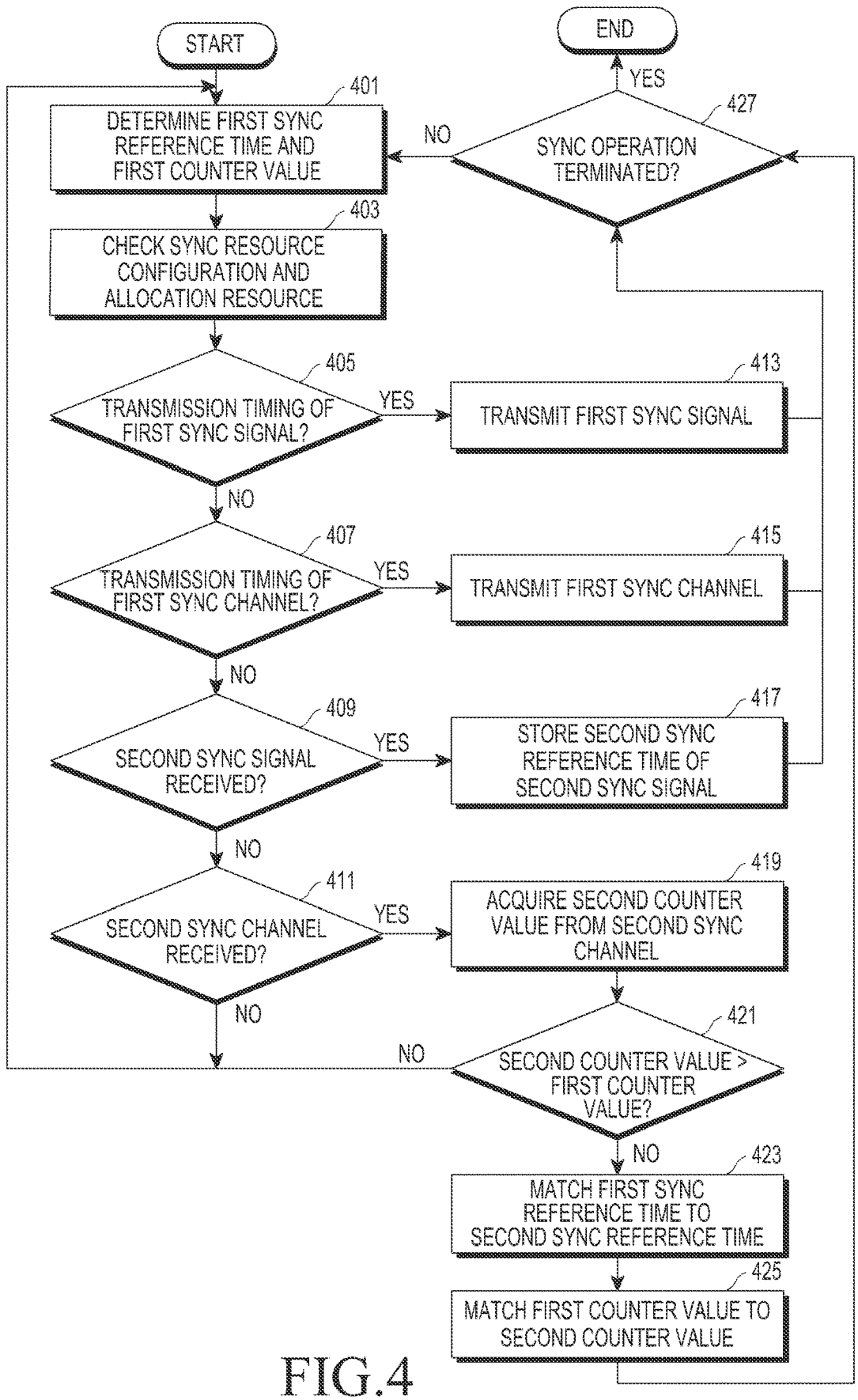
FIG. 4 is a flowchart illustrating a synchronization method based on a counter value in a D2D communication system according to an embodiment of the present disclosure.

FIG. 4 is a flowchart illustrating a synchronization method based on a counter value in a D2D communication system according to an embodiment of the present disclosure. The synchronization method in FIG. 4 represents an example in which a first device matches its own first synchronization reference time to a second synchronization reference time of a second synchronization signal received from a second device, if a second counter value received from the second device is greater than a first counter value, in the above-described comparison condition. Although the counter value is assumed to be transmitted over a synchronization channel in the example of FIG. 4, the counter value may be transmitted together with the synchronization signal. The comparison condition is not limited to the illustrated method in FIG. 4, and may be modified in various ways.

Referring to FIG. 4, in operation 401, the first device may determine its own first synchronization reference time and first counter value. In operation 403, the first device may check a configuration of synchronization resources which are resources of a synchronization signal and/or a synchronization channel, and a configuration of resources that are allocated for transmission/reception of a control signal and/or data in D2D communication. In operation 405, the first device may determine whether the current timing is a transmission timing of the first synchronization signal, and if the current timing is a transmission timing of the first synchronization signal, the first device may transmit its own first synchronization signal in operation 413. If it is determined in operation 405 that the current timing is not a transmission timing (e.g., a transmission period) of the first synchronization signal, the first device may determine in operation 407 whether the current timing is a transmission timing of its own first synchronization channel, and if the current timing is a transmission timing of the first synchronization channel, the first device may transmit the first synchronization channel in operation 415.

If it is determined in operation 407 that the current timing is not a transmission timing of the first synchronization channel, the first device may determine in operation 409 whether a second synchronization signal is received from the second device that is another synchronization transmission device, and if a second synchronization signal is received, the first device may store the second synchronization reference time of the second synchronization signal in operation 417. If it is determined in operation 409 that the second synchronization signal is not received, the first device may determine in operation 411 whether a second synchronization channel is received, and if the second synchronization channel is received, the first device may acquire (or receive) a second counter value from the second synchronization channel in operation 419. If it is determined in operation 411 that the second synchronization channel is not received, the first device may return to operation 401 and repeats the succeeding operations until the synchronization operation is terminated.

After acquiring the second counter value in operation 419, the first device may compare the second counter value with the first counter value in operation 421, and if the second counter value is greater than the first counter value, the first device may match the first synchronization reference time to the second synchronization reference time (i.e., may match synchronization to the second synchronization reference time) in operation 423. In operation 425, the first device may match the first counter value to the second counter value, and upon receiving a command to stop synchronization from the upper layer or another module, the first device may determine to terminate the synchronization operation in operation 427. Otherwise, the first device may return to operation 401 and repeats its succeeding operations.

Pulse Coupled Oscillator (PCO) Synchronization Method

First, an example of the PCO synchronization method will be described. The PCO synchronization method may use an oscillator or a counter in each synchronization transmission device, and may not need additional information from the outside except for the timing in which a synchronization signal is received. In the synchronization method based on a counter value, a counter value is transmitted through a synchronization signal or a synchronization channel, but the PCO synchronization method does not need to carry separate information on a synchronization signal.

In the PCO synchronization method, an operation of an oscillator or a counter in a device may be represented by a change in phase value of the oscillator or the counter. The phase value may increase over time starting from zero (0), and if the phase value reaches its maximum value, i.e., 1, may go back to 0 in a repeated way. If the current phase value is represented by $\phi_{current}$ and the phase value changed by the reception of a synchronization signal is represented by $\phi_{next}$, a delta function $\Delta$ may be used in a process of calculating or obtaining $\phi_{next}$ from $\phi_{current}$. The delta function may be defined as shown in Equation 1 below.

$$\Delta(\phi) = \alpha * \phi_{current} + \beta \qquad \text{Equation 1}$$

Equation 1 is a function of multiplying a current phase value of the oscillator or the counter in the device by $\alpha$, and adding $\beta$ to the multiplication result. $\alpha$ and $\beta$, which are coupling factors, may be determined as appropriate values in consideration of the synchronization performance and the convergence rate. $\alpha$ is a value of 1 or greater, and $\beta$ is a value between 0 and 1. If $\phi_{current} < \phi_{inactive}$ is satisfied, $\phi_{current}$ may not be adjusted. Otherwise, if $\phi_{current} \geq \phi_{inactive}$ is satisfied, $\phi_{current}$ may be adjusted to $\phi_{next}$. Here, $\phi_{inactive}$ is a value that is introduced to prevent errors in the synchronization operation by the signal propagation delay, and this value may be defined as two fold of the maximum propagation delay. In addition, $\phi_{next}$ may be determined by the following conditions. If $\phi_{current} + \Delta(\phi_{current}) \geq 1$ is satisfied, $\phi_{next}$ may be determined as $\phi_{next} = \min(1, \Delta(\phi_{current}))$. Otherwise, if $\phi_{current} + \Delta(\phi_{current}) \geq 1$ is satisfied, $\phi_{next}$ may be determined as $\phi_{next} = \phi_{current}$.

The above-described PCO synchronization method may be regarded as an operation of slightly advancing the phase if its own phase value is small upon reception of a synchronization signal, and greatly advancing the phase if its own phase value is large. In the PCO synchronization method, since an operation of adjusting the phase value each time a non-identical synchronization signal is received is performed until synchronization reference times of all devices are converged, the volatility may occur in the network. Therefore, an aspect of this embodiment may provide a simplified PCO synchronization method of adjusting the phase value only if $\phi_{next}$ is equal to or greater than 1, that is, the maximum phase value, and of not adjusting the phase value in other cases. In the simplified PCO synchronization method, the delta function $\Delta(\phi) = \alpha * \phi_{current} + \beta$ may be defined the same as Equation 1, and in its application process, if $\Delta(\phi) \geq 1$, the device may determine $\phi_{next}$ as $\phi_{next} = 1$ (i.e., synchronize its own synchronization reference time to the synchronization reference time of another device), and if $\Delta(\phi) < 1$, the device may determine $\phi_{next}$ as $\phi_{next} = \phi_{current}$ (i.e., maintain its own synchronization reference time).

Hybrid Method

The hybrid method, which is a synchronization method of using a combination of the counter value comparison method (or the synchronization method based on a counter value) and the PCO synchronization method, may be a method capable of further improving the synchronization performance of the counter value comparison method. Specifically, in the counter value comparison method, if the comparison condition is satisfied, the device may match its own synchronization reference time to the synchronization reference time of the synchronization signal received from another device. However, if the comparison condition is not satisfied, the device may maintain the existing synchronization reference time, and in this hybrid method, if the comparison condition is not satisfied, the device may adjust the synchronization reference time by additionally using the PCO synchronization method. For example, depending on a particular counter value comparison condition, if a counter value of a received synchronization signal is greater than its own counter value, the device may match its own synchronization reference time to the synchronization reference time of the received synchronization signal, and if a counter value of a received synchronization signal is equal to or less than its own counter value, the device may adjust the phase value to $\phi_{next}$ based on the current phase value $\phi_{current}$. The adjustment conditions may be applied to one of the two methods of the PCO synchronization method.

A description will now be made of a method for synchronizing a system frame number by transmitting and receiving synchronization channels according to an embodiment of the present disclosure.

The System Frame Number (SFN) may also be referred to as a Radio Frame Number (RFN), and even though synchronization for the frame boundary has been completed using the synchronization signal, if the operating procedure between different frames should be defined differently, it is necessary to determine in which frame each device is located. Therefore, the communication system may be designed to grant (system) frame numbers or indexes so as to make it possible to distinguish different frames. For example, in the LTE system, as in the example of FIG. 5, a Master Information Block (MIB) 501 may be transmitted over a Broadcast Channel (BCH) that is a broadcast channel for control, making it possible to inform the device of the SFN.

Figure 5:
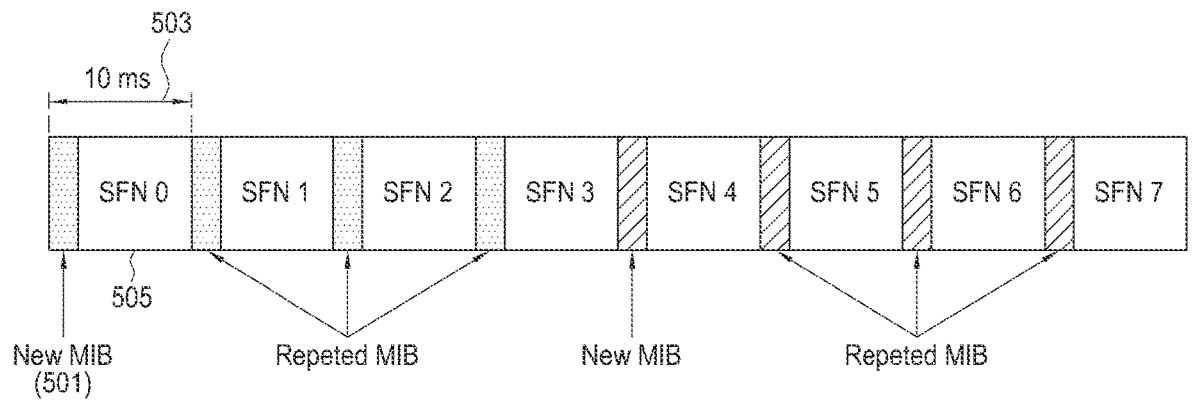
FIG. 5 illustrates an example of a frame structure in a Long Term Evolution (LTE) system according to an embodiment of the present disclosure.

FIG. 5 illustrates an example of a frame structure in an LTE system according to an embodiment of the present disclosure.

Referring to FIG. 5, MIB 501 may be transmitted in a first subframe SFN0 505 of one frame, and for example, 4 identical MIBs may be repeatedly transmitted using a 10 ms period 503. In the LTE system, SFN is information of, for example, 10 bits, and system frame numbers of 0 to 1023 may be represented using the 10-bit information. Since BCH originally undergoes 2-bit Cyclic Redundancy Check (CRC) masking, if BCH is received, 2-bit information may be determined. When MIB is transmitted in BCH, MIB may include some SFN information of 8 bits. By combining the 2-bit information and the 8-bit SFN of MIB, which can be determined upon reception of BCH, it is possible to exactly determine the original 10-bit SFN information.

Since one frame interval is 10 ms, SFN may represent the time of a maximum of 10 seconds. For example, if it is assumed that a broadcast interval for inter-device search is required once every 10 seconds, the eNB may transmit a System Information Block (SIB) in BCH that is a broadcast channel for control, informing SFN0 as an inter-device broadcast frame.

Figure 6:
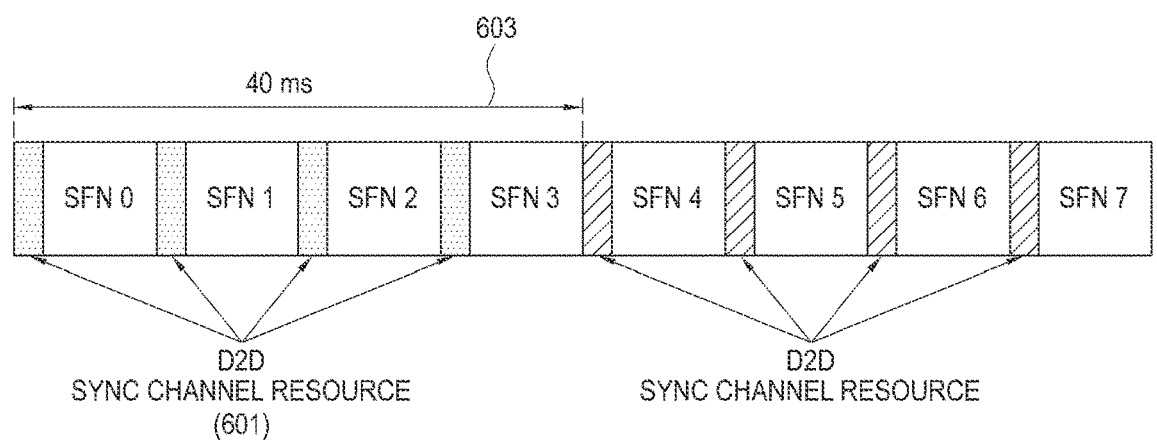
FIG. 6 illustrates an example of a frame structure in a D2D communication system according to an embodiment of the present disclosure.

FIG. 6 illustrates an example of a frame structure in a D2D communication system according to an embodiment of the present disclosure. This is based on the frame structure of the LTE system.

A frame structure of the LTE system is a format suitable for the cellular structure such as an eNB and a device. In the LTE system, the eNB may transmit system information including SFN to a plurality of devices (or UEs) located in its service coverage. However, in the D2D communication system, when system information including inter-device SFN is transmitted and received, it is difficult to determine to which device the SFN should be matched. The reason is because devices are equivalent to each other in term of the position without hierarchy. In the frame structure as shown in FIG. 6, if a period of D2DSCH resources 601 is assumed to be 40 ms 603, a maximum of 4 devices may transmit a synchronization channel signal in different D2DSCH resources.

In addition, an aspect of an embodiment of the present disclosure may provide a method for synchronizing a system frame number between synchronization transmission devices or between clusters, and additionally synchronizing D2D resource pool configuration information.

In the procedure for synchronizing a system frame number according to this embodiment, it will be assumed that in the synchronization procedure between synchronization transmission devices, each synchronization transmission device has a system frame number and resource pool configuration information. It will be assumed that in the synchronization procedure between clusters, a synchronization reference device each has a system frame number and resource pool configuration information, and a volunteering synchronization device serves to merely forward a system frame number and resource pool configuration information of the synchronization reference device.

Figure 7:
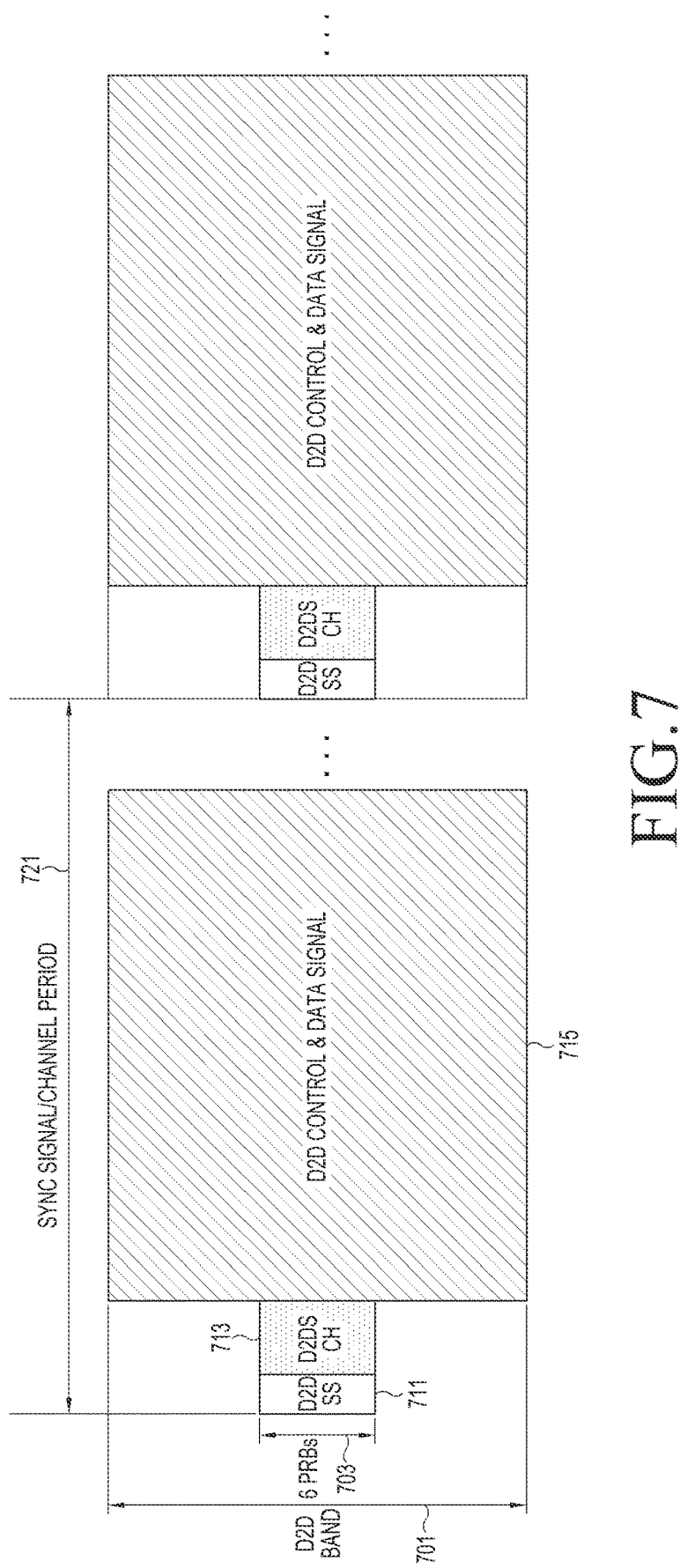
FIGS. 7, 8, and 9 illustrate a structure of synchronization resources for a synchronization signal and a synchronization channel in a D2D communication system according to various embodiments of the present disclosure.

FIG. 7 illustrates a structure of synchronization resources for a synchronization signal and a synchronization channel in a D2D communication system according to an embodiment of the present disclosure.

Referring to FIG. 7, a D2DSS 711 and a D2DSCH 713 may be transmitted using, for example, 6 PRBs 703 located in the center of a D2D band 701. Reference numeral 715 represents a resource region in which D2D control signal and data are transmitted. Although the D2D control signal and data are transmitted together in the example of FIG. 7, the resource regions in which the control signal and data are transmitted may be separated. Further, in FIG. 7, a synchronization transmission device may transmit the synchronization signal 711 and/or the synchronization channel 713 in the synchronization resources that are allocated by the eNB or allocated according to the predetermined rules. In FIG. 7, a synchronization signal period and a synchronization channel period may be the same as shown by reference numeral 721. In other words, FIG. 7 illustrates a resource structure for a case where a synchronization transmission device that transmits a synchronization signal transmits a synchronization channel in a predetermined synchronization resource. However, in the resource structure of FIG. 7, since adjacent synchronization transmission devices use the same synchronization resource, the synchronization reception performance may be degraded due to conflicts.

Figure 8:
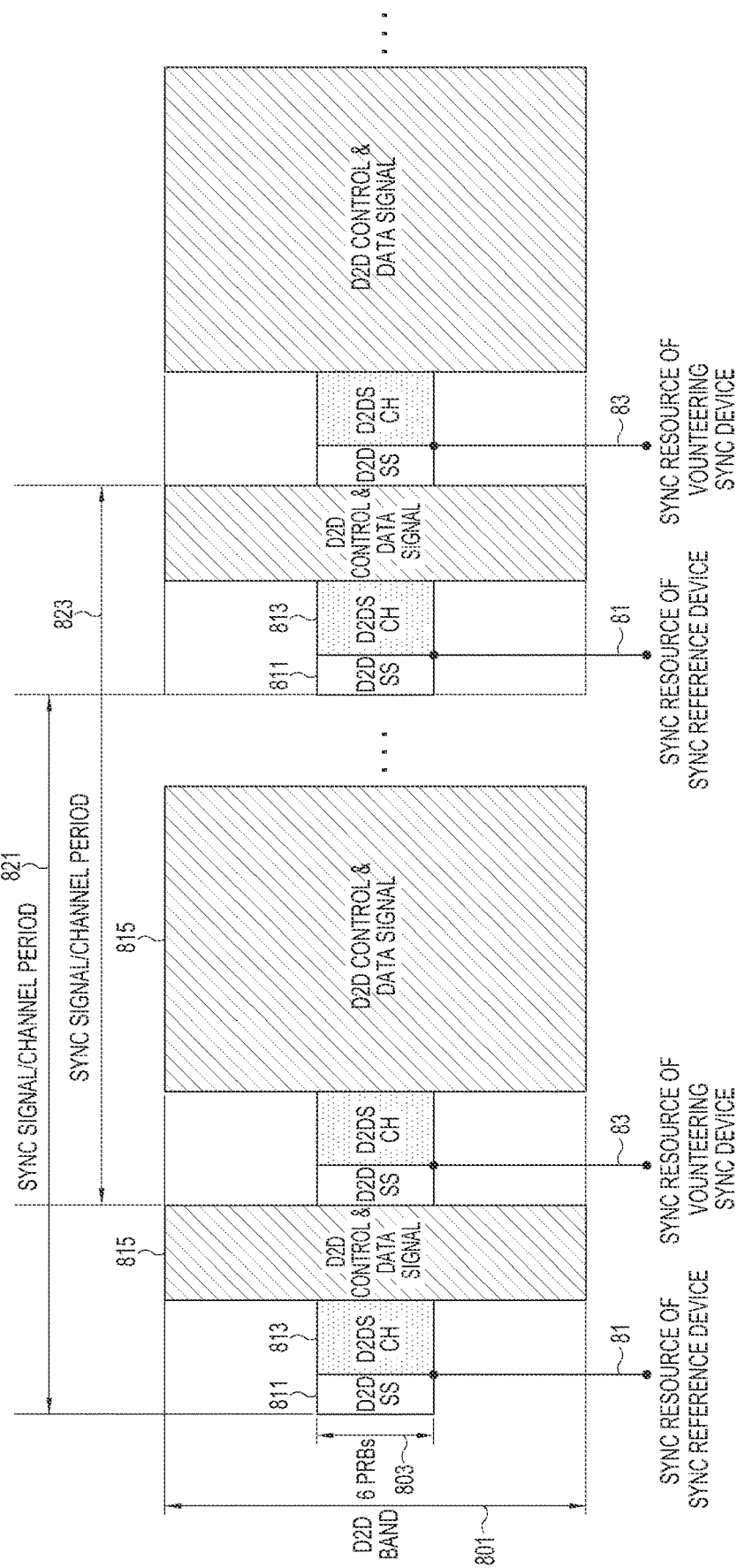

FIG. 8 illustrates a structure of synchronization resources for a synchronization signal and a synchronization channel in a D2D communication system according to another embodiment of the present disclosure.

Referring to FIG. 8, a synchronization signal 811 and a synchronization channel 813 may be transmitted using, for example, 6 PRBs 803 located in the center of a D2D band 801. Reference numeral 815 represents a resource region in which D2D control signal and data are transmitted. Although the D2D control signal and data are transmitted together in the example of FIG. 8, the resource regions in which the control signal and data are transmitted may be separated. Further, in FIG. 8, a synchronization reference device may transmit the synchronization signal 811 and/or the synchronization channel 813 in the synchronization resources that are allocated by the eNB or allocated according to the predetermined rules. In FIG. 8, reference numeral 821 represents a synchronization signal period and a synchronization channel period of a synchronization reference device, and reference numeral 823 represents a synchronization signal period and a synchronization channel period of a volunteering synchronization device. The example in FIG. 8 corresponds to the structure in which synchronization resources 81 used by the synchronization reference device and synchronization resources 83 used by the volunteering synchronization device use different resources that are allocated in the time domain in a Time Division Multiplexing (TDM) manner, in consideration of the ICS. In the resource structure of FIG. 8, the synchronization reference device may receive a synchronization signal and a synchronization channel of the volunteering synchronization device, and the volunteering synchronization device may receive a synchronization signal and a synchronization channel of the synchronization reference device.

Figure 9:
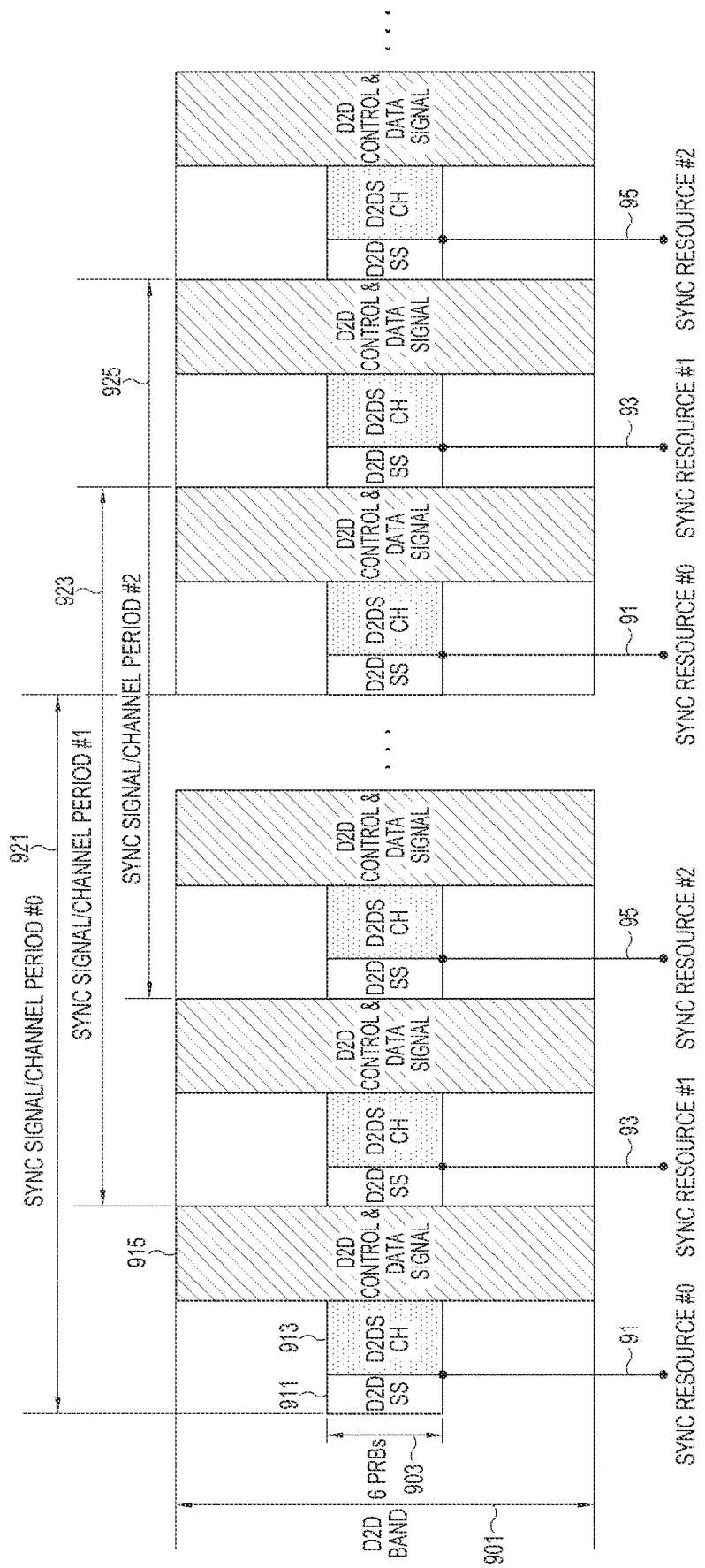

FIG. 9 illustrates a structure of synchronization resources for a synchronization signal and a synchronization channel in a D2D communication system according to further another embodiment of the present disclosure.

Referring to FIG. 9, a synchronization signal 911 and a synchronization channel 913 may be transmitted using, for example, 6 PRBs 903 located in the center of a D2D band 901. Reference numeral 915 represents a resource region in which D2D control signal and data are transmitted. Although the D2D control signal and data are transmitted together in the example of FIG. 9, the resource regions in which the control signal and data are transmitted may be separated. Further, in FIG. 9, a synchronization transmission device may transmit the synchronization signal 911 and/or the synchronization channel 913 in the synchronization resources that are allocated by the eNB or allocated according to the predetermined rules. In FIG. 9, reference numerals 921, 923, and 925 represent synchronization signal periods and synchronization channel periods in synchronization resources #0, #1, and #2 represented by 91, 93, and 95, respectively. The example in FIG. 9 corresponds to the structure of sensing a plurality of synchronization resources 91, 93, and 95, and selecting one of the synchronization resources 91, 93, and 95, from which a synchronization signal or a synchronization channel from another synchronization transmission device is not detected, without the synchronization resources used by the synchronization transmission device pre-determined, in consideration of inter-device synchronization. In this structure, the synchronization transmission device may receive a synchronization signal or a synchronization channel transmitted from another synchronization transmission device in the remaining synchronization resources in which the synchronization transmission device itself does not transmit a synchronization signal or a synchronization channel. In addition, the synchronization transmission device may broadcast index information of the synchronization resource selected by the synchronization transmission device itself or information about the time offset to the synchronization reference time of the system, using a synchronization signal or a synchronization channel, so a synchronization reception device that has received the time offset information may estimate the synchronization reference time based on the synchronization signal reception point.

Figure 10:
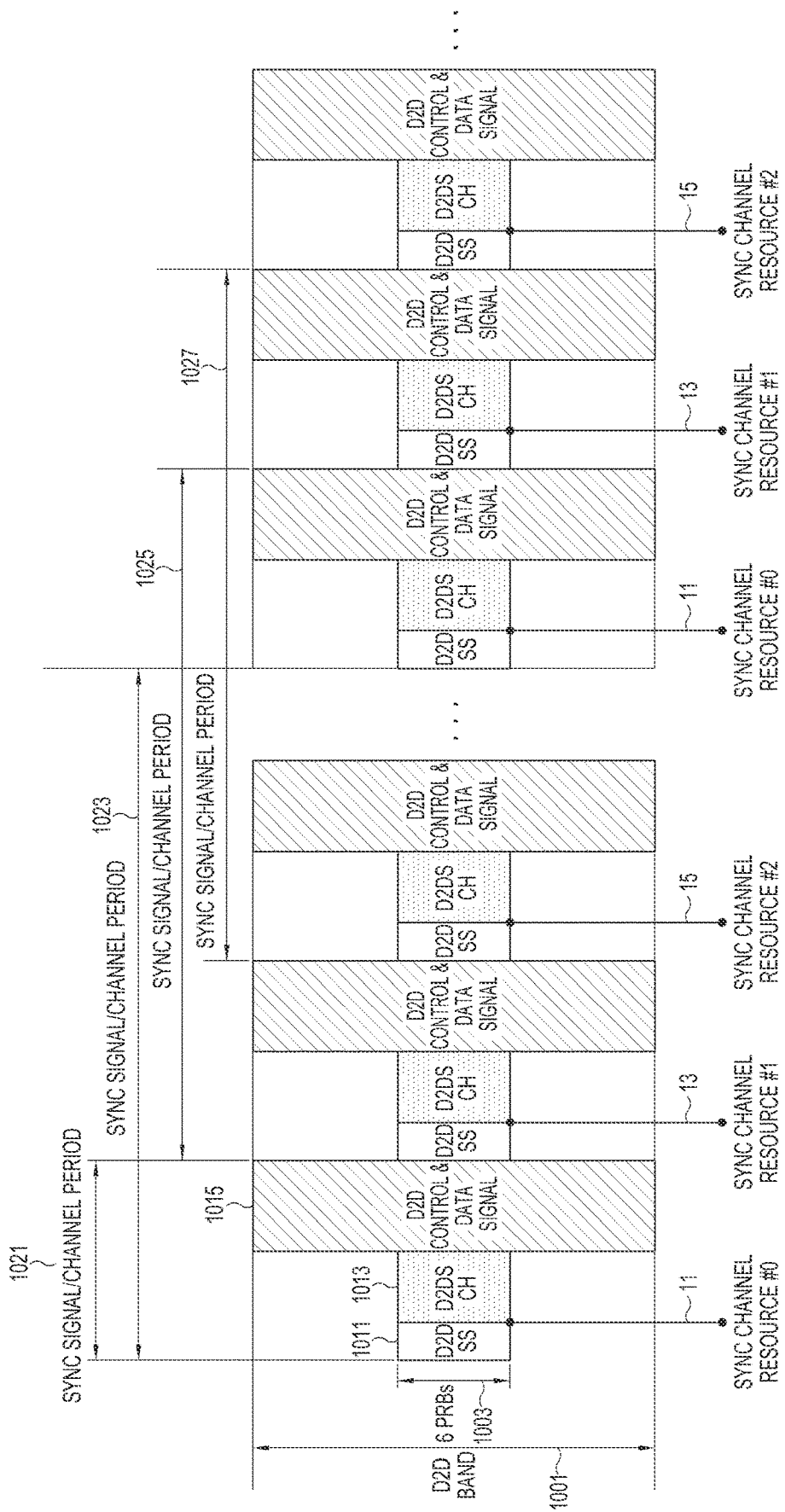
FIG. 10 illustrates a structure of synchronization resources for a synchronization signal and a synchronization channel in a D2D communication system according to further another embodiment of the present disclosure.

FIG. 10 illustrates a structure of synchronization resources for a synchronization signal and a synchronization channel in a D2D communication system according to further another embodiment of the present disclosure.

Referring to FIG. 10, a synchronization signal 1011 and a synchronization channel 1013 may be transmitted using, for example, 6 PRBs 1003 located in the center of a D2D band 1001. Reference numeral 1015 represents a resource region in which D2D control signal and data are transmitted. Although the D2D control signal and data are transmitted together in the example of FIG. 10, the resource regions in which the control signal and data are transmitted may be separated. Further, in FIG. 10, a synchronization transmission device may transmit the synchronization signal 1011 and/or the synchronization channel 1013 in the synchronization resources that are allocated by the eNB or allocated according to the predetermined rules. In FIG. 10, reference numerals 1021, 1023, 1025, and 1027 represent synchronization signal periods and synchronization channel periods. Reference numerals 11, 13, and 15 represent synchronization channel resources #0, #1, and #2. In the example of FIG. 10, while at least one synchronization transmission device is periodically transmitting a synchronization signal, multiple synchronization channel resources are located in multiples of the synchronization signal period, and each device may select one of the synchronization channel resources according to the measurement result or the predetermined condition, and transmit a synchronization channel using the selected synchronization channel resource. In this structure, since a device that has transmitted a synchronization signal and a device that has transmitted a synchronization channel may not be the same in one synchronization resource bundle of a synchronization signal and a synchronization channel, it is necessary to connect a transmission entity of a synchronization signal and a transmission entity of a synchronization channel using a method of transmitting an identifier (ID) included in a synchronization signal on a synchronization channel or performing CRC masking on a synchronization channel using the identifier in the physical layer. In this structure, the synchronization transmission device may receive a synchronization signal or a synchronization channel transmitted from another synchronization transmission device in the remaining synchronization resources in which the synchronization transmission device itself does not transmit a synchronization signal or a synchronization channel.

As another example, synchronization resources for the synchronization reference device may be fixed as shown in FIG. 8, but synchronization resources for the volunteering synchronization device may be selected and determined by the volunteering synchronization device as shown in FIG. 9.

Figure 11:
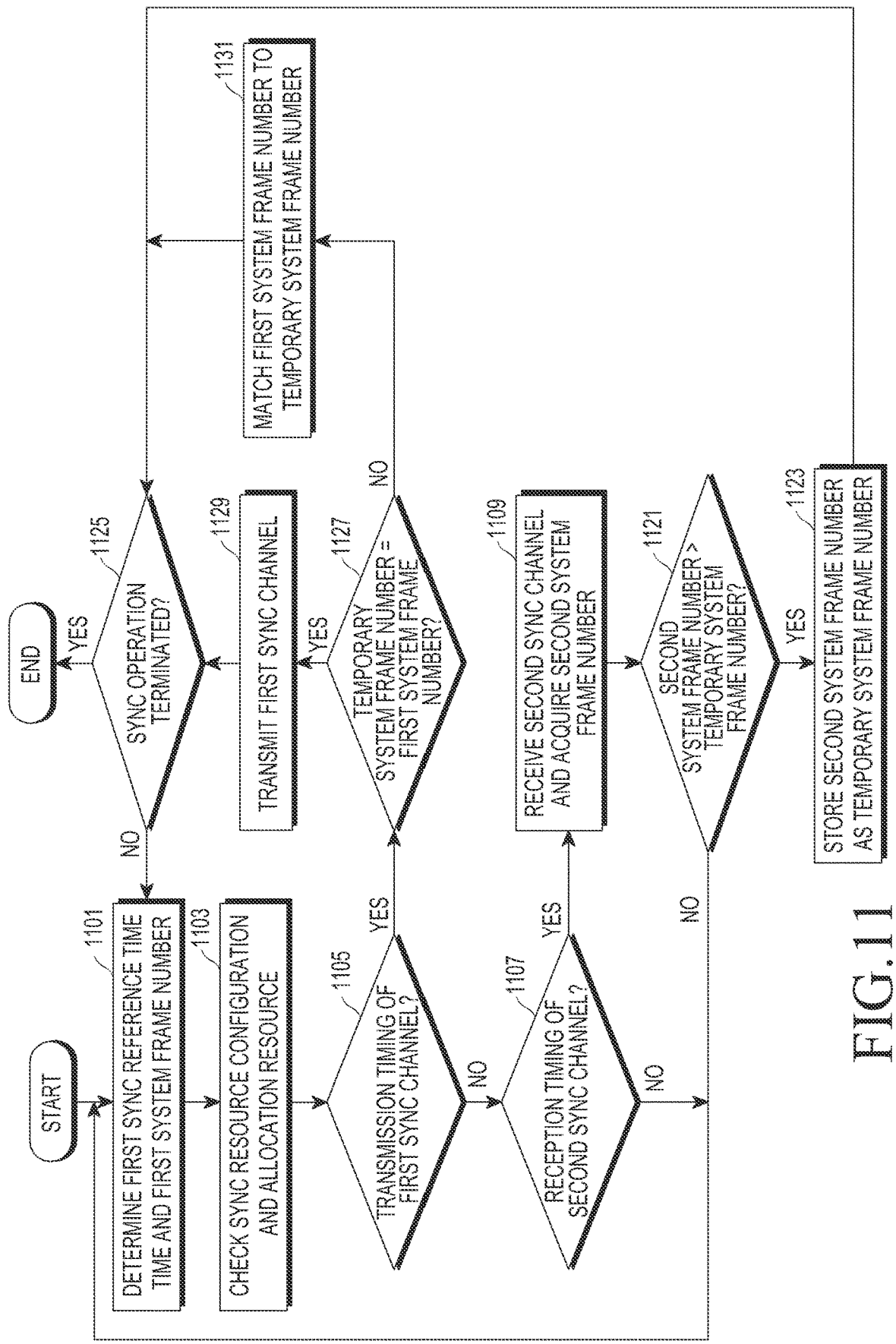
FIG. 11 is a flowchart illustrating a method for synchronizing a system frame number in a D2D communication system according to an embodiment of the present disclosure.

Reference will now be made to FIG. 11 to describe a method for synchronizing a system frame number included in a synchronization channel when performing an operation of transmitting/receiving a synchronization channel between devices based on the resource structure of a synchronization signal and a synchronization channel, which has been described in FIGS. 7 to 10.

FIG. 11 is a flowchart illustrating a method for synchronizing a system frame number in a D2D communication system according to an embodiment of the present disclosure.

Referring to FIG. 11, in operation 1101, a synchronization transmission device may determine its own first synchronization reference time and first system frame number. The synchronization transmission device may transmit the system frame number over a synchronization channel. In operation 1103, the synchronization transmission device may check synchronization resource configuration and allocated resources depending on the resource structure described in FIGS. 7 to 10. The synchronization transmission device may determine in operation 1105 whether the current timing is transmission timing of its own first synchronization channel, depending on the checked resource structure. If the current timing is not transmission timing, the synchronization transmission device may determine in operation 1107 whether the current timing is reception timing of a second synchronization channel transmitted from another synchronization transmission device. If the current timing is not reception timing of the second synchronization channel, the synchronization transmission device may return to operation 1101 and repeat the succeeding operations.

However, if it is determined in operation 1107 that the current timing is reception timing of a second synchronization channel (e.g., the synchronization transmission device has not transmitted a synchronization signal), the synchronization transmission device may receive a second synchronization channel from another synchronization transmission device and acquire a second system frame number from the received second synchronization channel, in operation 1109. Thereafter, in operation 1121, the synchronization transmission device may compare the second system frame number with its own first system frame number. As to the comparison condition, the synchronization transmission device may determine the received system frame number in various ways, for example, may determine whether its own first system frame number is greater than the received second system frame number, whether its own first system frame number is equal to or greater than the received second system frame number, whether its own first system frame number is less than the received second system frame number, or whether its own first system frame number is equal to or less than the received second system frame number. In the example of FIG. 11, the synchronization transmission device may determine whether the second system frame number is greater than the first system frame number. If it is determined in operation 1121 that the second system frame number is greater than the first system frame number (e.g., the comparison condition is satisfied), the synchronization transmission device may store (or regard) the second system frame number as a temporary system frame number in operation 1123. In this case, the synchronization transmission device storing the temporary system frame number may determine to terminate this synchronization channel period in operation 1125.

However, if it is determined in operation 1105 that the current timing is transmission timing of the first synchronization channel, the synchronization transmission device may compare the stored temporary system frame number with the first system frame number in operation 1127. As a result of the comparison, if the stored temporary system frame number and the first system frame number are the same, the synchronization transmission device may transmit the first synchronization channel in operation 1129, determining that the system frame numbers are synchronized, and determine to terminate the synchronization operation in operation 1125. However, if it is determined in operation 1127 that the stored temporary system frame number and the first system frame number are different from each other, the synchronization transmission device may match the first system frame number to the stored temporary system frame number in operation 1131, without transmitting a synchronization channel in the next synchronization channel timing. After deciding the temporary system frame number, the synchronization transmission device may transmit a synchronization signal and a synchronization channel in the next synchronization resource timing.

As another example, for simplicity of operation, the temporary system frame number may not be used in FIG. 11, and if the received second system frame number is greater than the first system frame number, the synchronization transmission device may immediately match the first system frame number to the second system frame number, performing synchronization.

Although not illustrated in FIG. 11, in another embodiment, the synchronization transmission device may compare system frame numbers included multiple synchronization channels that the synchronization transmission device has received during the whole system frame period spanning from the minimum value to the maximum value of the system frame number, and match its own system frame number to the system frame number that is transmitted over one synchronization channel having, for example, the largest system frame number.

In the LTE system, since the system frame number, which is 10-bit information of 0 to 1023, may be a number that is too long to be used in the D2D environment, the system frame numbers may be distinguished by a modular operation, enabling a SA/Data/Discovery structure to be repeated in the divided regions.

In addition, resource pool configuration information for D2D may be transmitted in a synchronization channel, and it is possible to determine whether to match the resource pool configuration information under the same condition as the condition for determining the system frame number. In addition, depending on the system, the synchronization resource structure may be included in the resource pool configuration information. In this case, it is possible to first perform synchronization for the resource pool configuration information based on the synchronization signal and the synchronization channel without completing the synchronization of the synchronization reference time. If synchronization is achieved through the synchronization resource structure included in the resource pool configuration information, the exact reference time synchronization is finally possible.

In the above-described embodiments, the synchronization of the inter-device synchronization reference time, the system frame number and the resource pool configuration information has been described. However, if the synchronization transmission device receives a synchronization signal and a synchronization channel from the eNB or synchronization transmission devices belonging to the eNB, the synchronization transmission device may match its own reference time or system frame number to the reference time or system frame number of the synchronization signal that the synchronization transmission device has received from the eNB or synchronization transmission devices belonging to the eNB, by placing a higher priority than the comparison condition for determining a synchronization signal and a synchronization channel, which is illustrated in embodiments of the present disclosure.

Further, in the embodiments of the present disclosure, in some cases, a device that transmits a synchronization signal may be different from a device that transmits a synchronization channel. In order to inform the connectivity of a synchronization signal and a synchronization channel, after acquiring a synchronization transmission device ID (or cluster ID) by receiving a synchronization signal, if the device receives a synchronization channel, the device may identify the synchronization channel corresponding to the same synchronization transmission device ID (or cluster ID). Whether the synchronization transmission device ID (or cluster ID) is connected or not may be determined by decoding the synchronization channel and checking a control field including a synchronization transmission device ID, or by CRC-masking the synchronization channel with the synchronization transmission device ID.

Besides, in this embodiment, when a D2D device selects one of multiple synchronization signals or selects one of multiple synchronization channels, there may be various determination conditions (or criteria). As the criteria, at least one of a reception power strength of a synchronization signal or a synchronization channel, a relay hop count, an age of the synchronization transmission device, a subframe index, a system frame number, and a PCO synchronization method may be used. Depending on the situation, an arbitrary device may select a synchronization signal and a synchronization channel according to the result of the determination condition for the synchronization signal; another device may select a synchronization signal and a synchronization channel according to the result of the determination condition for the synchronization channel, reserving the determination for the synchronization signal; or further another device may select a synchronization signal and a synchronization channel depending on their determination (or comparison) condition. For example, if a synchronization signal transmitted by the eNB and a synchronization signal transmitted by a device are distinguished and a relay hop count is transmitted on a synchronization channel, a device may preferentially receive a synchronization signal received from the eNB compared with a synchronization signal received from a device, among the multiple synchronization signals, follow the synchronization reference time, and follow the contents of a synchronization channel connected to the synchronization signal received from the eNB. If there are only multiple synchronization signals received from a device, the device may receive a synchronization channel of each synchronization signal and follow the synchronization reference time of the synchronization signal connected to the synchronization channel having the smallest hop count. For this operation, a priority table for various determination (or comparison) conditions may be pre-configured in the device, or may be adjusted by the eNB. In addition, information about whether each determination (or comparison) condition is transmitted in a synchronization signal or a synchronization channel may be stored in the device in advance. In this manner, the device may perform synchronization starting from the high-priority determination (or comparison) condition, and if one synchronization transmission device is selected through a particular determination (or comparison) condition, the device may follow the synchronization reference time for the synchronization signal from the device, and synchronize information (e.g., a system frame number and a D2D resource region) about the synchronization channel.

Figure 12:
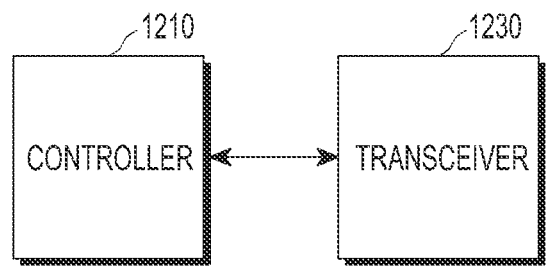
FIG. 12 illustrates a configuration of a device in a D2D communication system according to an embodiment of the present disclosure.

FIG. 12 illustrates a configuration of a device in a D2D communication system according to an embodiment of the present disclosure.

The device in FIG. 12 may include a controller 1210 for controlling a synchronization operation for D2D communication according to the scheme described in FIGS. 1 to 11, and a transceiver 1230 for performing signal transmission/reception with other devices. The controller 1210 and the transceiver 1230 are illustrated as separate components, but may be implemented in the form of one or multiple processors or chips. In addition, the above-described operations of the eNB or the device may be implemented by mounting a memory device storing the program code in an arbitrary component in the eNB or the device. In other words, a controller of the eNB or the device may perform the above-described operations by reading out and executing the program code stored in the memory device by means of a processor or a Central Processing Unit (CPU).

The entities, modules and various components of the eNB or the device, which are described in this specification, may be operated using a hardware circuit (e.g., a Complementary Metal Oxide Semiconductor (CMOS)-based logic circuit), firmware, and software, and/or a hardware circuit such as a combination of hardware, firmware and/or software embedded in a machine-readable medium. For example, various electrical structures and methods may be implemented using electrical circuits such as transistors, logic gates and Application Specific Integrated Circuits (ASICs).

According to the above-described embodiment of the present disclosure, the present disclosure may provide a synchronization method that is efficient in a D2D communication system, and may also support both of the inter-device and ICS methods in point-to-point, point-to-multipoint or broadcast communication between devices, making it possible to meet both the low power consumption and high-performance synchronization. According to an embodiment of the present disclosure, it is possible to avoid the inter-device interference and expect improvement of the communication performance in point-to-point, point-to-multipoint or broadcast communication between devices. In addition, an aspect of an embodiment of the present disclosure may provide the resource structure and procedure that is required for D2D communication in partial network coverage or out of network coverage.

The above-described aspects of the present disclosure can be implemented in the form of computer-executable program commands stored in a non-transitory computer-readable storage medium. The non-transitory computer-readable storage medium is a data storage device capable of storing the data readable by a computer system. Examples of the computer-readable storage medium include Read-Only Memory (ROM), Random-Access Memory (RAM), Compact Disc (CD) ROM, magnetic tape, floppy disc, optical data storage devices, and carrier waves (such as data transmission through Internet). The non-transitory computer-readable storage medium may be distributed to the computer systems connected through a network such that the computer-readable codes are stored and executed in a distributed manner. The functional programs, codes, and code segments for implementing the present disclosure can be interpreted by the programmers skilled in the art.

The apparatus and method according to an embodiment of the present disclosure can be implemented by hardware, software, or a combination thereof. Certain software can be stored in volatile or nonvolatile storage device such as ROM, memory such as RAM, memory chip, and integrated circuit, and storage media capable of recordable optically or magnetically or readable by machines (e.g., computer) such as CD, Digital Versatile Disc (DVD), magnetic disc, and magnetic tape. The method according to an embodiment of the present disclosure can be implemented by a computer or a mobile terminal including a controller and a memory, and the memory is a storage medium capable of storing and reading the program or programs including the instructions implementing the various embodiments of the present disclosure.

Thus the present disclosure includes the programs including the codes for implementing the apparatus and method specified in a claim of the present disclosure and a non-transitory machine-readable (computer-readable) storage media capable of storing the program and reading the program.

The apparatus according to an embodiment of the present disclosure may receive the program from a program providing device connected through a wired or wireless link and store the received program. The program providing device may include a program including instructions executing a pre-configured contents protection method, a memory for storing information necessary for the contents protection method, a communication unit for performing wired or wireless communication with a graphic processing device, and a controller for transmitting a request of the graphic processing device or the corresponding program automatically to the transceiver.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for performing synchronization by a device in a device to device (D2D) communication system, the method comprising:
    identifying, by the device, offset information indicating a time difference in a time domain between a synchronization reference timing of the D2D communication system and a transmission timing of a synchronization signal for D2D communication;
    identifying, by the device, a same synchronization transmission identifier (ID) as a synchronization transmission ID of a synchronization reference device included in the D2D communication system; and
    transmitting, by the device, the synchronization signal based on the offset information and the same synchronization transmission ID,
    wherein the transmission timing of the synchronization signal is different from a transmission timing of a synchronization signal of the synchronization reference device.

2. The method of claim 1, wherein the offset information is used to determine the synchronization reference timing by a device that receives the synchronization signal.

3. The method of claim 1, further comprising:
    identifying first control information including a first counting value and a first synchronization reference timing of the device;
    receiving, from another device, second control information including a second counting value and a second synchronization reference timing of the other device; and
    if the second counting value is above the first counting value, synchronizing the first synchronization reference timing to the second synchronization reference timing,
    wherein the first counting value and the second counting value are at least one of a timer value, or time resource index, or a transmission number of the synchronization signal.

4. The method of claim 1, wherein the synchronization reference device is different from the device.

5. The method of claim 4, further comprising:
    selecting a subframe in which the synchronization signal is transmitted.

6. A device for performing synchronization in a device to device (D2D) communication system, the device comprising:
at least one processor configured to:
identify offset information indicating a time difference in a time domain between a synchronization reference timing of the D2D communication system and a transmission timing of a synchronization signal for D2D communication,
identify a same synchronization transmission identifier (ID) as a synchronization transmission ID of a synchronization reference device included in the D2D communication system; and
a transceiver coupled to the at least one processor, and configured to:
transmit the synchronization signal based on the offset information and the same synchronization transmission ID,
wherein the transmission timing of the synchronization signal is different from a transmission timing of a synchronization signal of the synchronization reference device.

7. The device of claim 6, wherein the offset information is used to determine the synchronization reference timing by a device that receives the synchronization signal.

8. The device of claim 6, wherein the synchronization reference device is different from the device.

9. The device of claim 8, wherein the transceiver is further configured to select a subframe in which the synchronization signal is transmitted.

10. A method for performing synchronization by a device in a device to device (D2D) communication system, the method comprising:
receiving, by the device, a first synchronization signal for D2D communication from a synchronization transmission device;
identifying, by the device, offset information indicating a time difference in a time domain between a synchronization reference timing of the D2D communication system and a transmission timing of a second synchronization signal for D2D communication that has a time difference with respect to the first synchronization signal;
identifying, by the device, a same synchronization transmission identifier (ID) as a synchronization transmission ID of the synchronization transmission device included in the D2D communication system; and
transmitting the second synchronization signal based on the offset information and the same synchronization transmission ID,
wherein the transmission timing of the synchronization signal is different from a transmission timing of a synchronization signal of the synchronization reference device.

11. The method of claim 10, wherein the second synchronization signal is transmitted out of service coverage of an evolved Node B (eNB).

12. The method of claim 10, wherein the first synchronization signal and the second synchronization signal are transmitted via different resources.

13. The method of claim 10, wherein the offset information is used to determine the synchronization reference timing by a device that receives the second synchronization signal.

14. The method of claim 10, wherein the synchronization transmission device is different from the device.

15. A device for performing synchronization in a device to device (D2D) communication system, the device comprising:
at least one processor; and
a transceiver coupled to the at least one processor, and configured to:
receive a first synchronization signal for D2D communication from a synchronization transmission device,
identify offset information indicating a time difference in a time domain between a synchronization reference timing of the D2D communication system and a transmission timing of a second synchronization signal for D2D communication that has a time difference with respect to the first synchronization signal,
identify a same synchronization transmission identifier (ID) as a synchronization transmission ID of the synchronization transmission device included in the D2D communication system, and
transmit the second synchronization signal based on the offset information and the same synchronization transmission ID,
wherein the transmission timing of the synchronization signal is different from a transmission timing of a synchronization signal of the synchronization reference device.

16. The device of claim 15, wherein the second synchronization signal is transmitted out of service coverage of an evolved Node B (eNB).

17. The device of claim 15, wherein the first synchronization signal and the second synchronization signal are transmitted via different resources.

18. The device of claim 15, wherein the offset information is used to determine the synchronization reference timing by a device that receives the second synchronization signal.

19. The device of claim 15, wherein the synchronization transmission device is different from the device.

20. A method for performing synchronization by a device in a device to device (D2D) communication system, the method comprising:
receiving, by the device, a second synchronization signal for D2D communication that has a time difference with respect to a first synchronization signal for D2D communication;
identifying, by the device, offset information indicating a time difference in a time domain between a synchronization reference timing of the D2D communication system and a transmission timing of the second synchronization signal;
identifying, by the device, a same synchronization transmission identifier (ID) as a synchronization transmission ID of a synchronization reference device with respect to the first synchronization signal for the D2D communication; and
determining, by the device, the synchronization reference timing of the D2D communication system based on the offset information and the same synchronization transmission ID,
wherein the transmission timing of the synchronization signal is different from a transmission timing of a synchronization signal of the synchronization reference device.

21. The method of claim 15, wherein the second synchronization signal is transmitted out of service coverage of an evolved Node B (eNB).

22. The method of claim 15, wherein the first synchronization signal and the second synchronization signal are transmitted via different resources.

23. The method of claim 15, wherein the second synchronization signal is transmitted from another device that receives the first synchronization signal.

24. The method of claim 20, wherein the synchronization reference device is different from the device.

25. A device for performing synchronization in a device to device (D2D) communication system, the device comprising:
at least one processor; and
a transceiver coupled to the at least one processor, and configured to:
receive a second synchronization signal for D2D communication that has a time difference with respect to a first synchronization signal for D2D communication,
wherein the at least one processor is configured to:
identify offset information indicating a time difference in a time domain between a synchronization reference timing of the D2D communication system and a transmission timing of the second synchronization signal,
identify a same synchronization transmission identifier (ID) as a synchronization transmission ID of a synchronization reference device with respect to the first synchronization signal for the D2D communication, and
determine the synchronization reference timing of the D2D communication system based on the offset information and the same synchronization transmission ID,
wherein the transmission timing of the synchronization signal is different from a transmission timing of a synchronization signal of the synchronization reference device.

26. The device of claim 25, wherein the second synchronization signal is transmitted out of service coverage of an evolved Node B (eNB).

27. The device of claim 25, wherein the first synchronization signal and the second synchronization signal are transmitted via different resources.

28. The device of claim 25, wherein the second synchronization signal is transmitted from another device that receives the first synchronization signal.

29. The device of claim 25, wherein the synchronization reference device is different from the device.

* * * * *